United States Patent Office 2,945,828
Patented July 19, 1960.

2,945,828

COMPOSITE MATERIALS FOR PRODUCING CELLULAR POLYETHYLENE ARTICLES

George E. Henning, Baltimore, Md., assignor to Western Electric Company, Incorporated, New York, N.Y., a corporation of New York No Drawing. Filed Feb. 20, 1957, Ser. No. 641,275

3 Claims. (Cl. 260—2.5)

The present invention relates generally to composite materials for producing cellular polyethylene articles, and more particularly to certain blends of polyethylene, polystyrene, and a finely divided blowing agent.

In the preparation of polyethylene and dust-like blowing agent mixtures for making extruded expanded polyethylene products, such as insulation for electrical conductors, it has been the practice in the past to apply a paraffin base wax to the surface of the polyethylene granules to secure the dust-like blowing agent thereto. If such a sticking agent is not used the blowing agent tends to segregate at the bottom of the extruder hopper, thus producing a mixture at the bottom of the hopper which is too rich in blowing agent and a mixture in the upper portion thereof which is too lean in blowing agent. It has been found, however, that by including the paraffin base wax in the blowing agent-polyethylene mixture, an objectionable slippage of the plastic compound is caused backwardly along the extrusion screw in the extrusion chamber. Another disadvantage of the use of such wax is that while it maintains a uniform mixture in the extruder hopper it tends to segregate somewhat when the mixture is transported in bags or the like from place to place.

Another method presently used for the preparation of blowing agent and plastic blends is milling or working the compounds together unitl a viscous mixture of the plastic with the blowing agent therein is produced. A disadvantage of such a method is that the temperature necessary to bring the plastic into a viscous state may be as high as or higher than the temperature at which the blowing agent begins to decompose so that premature blowing is caused.

An object, therefore, of the invention is to provide new and improved composite materials useful in producing cellular polyethylene articles.

Another object is to provide a uniform dust-like blowing agent and polyethylene blend which will have little tendency to slip backwardly along the feed screw in an extrusion operation.

Another object of the present invention is to provide a blowing agent and polyethylene blend which will not segregate during jarring or shaking thereof.

A dry composite material suitable for use in the production of extruded cellular polyethylene, illustrating certain features of the invention, may include a plurality of relatively large granules of polyethylene, a film of polystyrene coating substantially uniformly the surfaces of each granule of polyethylene, and a minor amount of blowing agent for polyethylene in the form of extremely-finely divided particles thereof adhered to the granules of polyethylene by the polystyrene film. The blowing agent is of a type which is thermally decomposable during the extrusion of polyethylene into gaseous products leaving no polar residue. The minor amount of the blowing agent must be at least sufficient to produce the desired expansion and less than about 15 parts by weight of the blowing agent to 100 parts by weight of the polyethylene.

Accordingly, the invention is concerned with securely binding a predetermined number of extremely finely-divided, dust-like, particles of a suitable blowing agent to the surfaces of a plurality of relatively large granules of an extrudable base resin. In a subsequent extrusion process, the base resin is expanded by the applied blowing agent into cellular form. The invention is specifically concerned with the dry composite material so formed, which material is well suited for use in the extrusion of cellular plastic materials.

According to well-known methods, the composite material of the invention is subjected to heat and pressure in a conventional extrusion apparatus to fluidize the plastic and to decompose the tiny particles of the blowing agent suspended therein into gaseous decomposition products, which are trapped within the fluid plastic material in the form of a multiplicity of discrete cells. When the pressure is removed from the fluid material upon discharge thereof from the extrusion apparatus, the gas cells expand the plastic material into the desired cellular form.

The weight percentages of the blowing agent required to produce particular degrees of expansion will vary over a wide range depending on such factors as the type of blowing agent, the degree of comminution thereof, the conditions of the extrusion process, and in some cases the particular article being extruded.

In order to provide for a uniform amount of gas over a given length of the extruded cellular plastic material, and thus for a uniform density product, it is obviously necessary to provide a uniform starting mixture of the relatively large granules of the base resin with the extremely finely-divided, dust-like, particles of the blowing agent so that each of the relatively large granules of the base resin has adhered thereto a predetermined number of the finely-divided particles of the blowing agent. It is this uniformly-compounded starting material, and the methods of manufacture thereof, with which the invention is concerned.

A specific example illustrating the principles of the invention will now be described in detail, it being realized that the example is illustrative only.

*Example*

For the purposes of this example, ti will be assumed that it is desired to prepare a starting mixture for an extrusion process comprising one hundred parts by weight of polyethylene in the form of a plurality of relatively large granules, uniformly admixed with one part by weight of an extremely finely-divided, dust-like, blowing agent such as "Celogen–AZ." Such a starting mixture is suitable for producing extruded, cellular polyethylene insulation for electrical conductors.

A polyethylene-blowing agent (100:1) starting mixture suitable for extrusion may conveniently be prepared by what is termed the "master batch" method of mixing, wherein a composite mixture of polyethylene and the blowing agent is first formed, having a higher percentage of the blowing agent than desired in the starting mixture for the extrusion process. The high-concentration, composite mixture from the master batch is then diluted to the desired strength by thorough mixing with a sufficient quantity of pure polyethylene granules to yield the desired starting proportions for the extrusion process.

The instant example will consider the compounding of a master batch to form a composite material comprising one hundred parts by weight of granular polyethylene uniformly admixed with eight parts by weight of "Celogen–AZ" blowing agent. This composite material may then be diluted with seven hundred parts by weight of pure polyethylene to form the desired starting mixture of one hundred parts by weight of polyethylene to one part by weight of "Celogen–AZ." It will be understood that the "master batch" method need not be used; that the composite mixture of polyethylene and "Celogen–AZ" might be compounded to exactly the strength desired for the starting mixture. The "master batch" method is preferred, however, since the volumes involved are kept to a minimum and, if the master batch is made sufficiently strong, a wide range of starting proportions may be formulated using the same master batch.

In order to compound a master batch comprising one hundred parts by weight of polyethylene granules uniformly admixed with eight parts by weight of the finely divided "Celogen–AZ," one hundred parts by weight of granular polyethylene having a particle size of about one-eighth of an inch are placed in a suitable mixer such as a ribbon blender, a drum tumbler, a mechanical agitator or some other suitable mixer. A resin having similar electrical properties to polyethylene (with regard to power factor and dielectric constant), such as polystyrene, is dissolved in a suitable solvent which is fairly volatile at room temperature, such as toluene, in the proportions of 20% polystyrene to 80% toluene by weight, thus producing a viscous solution of the resin.

Eight parts by weight of "Celogen–AZ," in the form of extremely finely-divided particles of about 15 microns diameter, are then mixed with six parts by weight of the polystyrene-toluene solution so as to produce a suspension of the blowing agent in the viscous solution. The mixer is started and the polystyrene-toluene-"Celogen–AZ" suspension is poured over the polyethylene therein. As the mixer blends the resulting substance, the liquid suspension is distributed uniformly over the surfaces of the granules of polyethylene.

After the mixing has produced a uniform liquid coating upon the polyethylene granules, the mixing is stopped and the toluene evaporated by a commercial type of dryer, such as a conveyor type dryer employing a current of warm air. If desired the toluene can be reclaimed by employing suitable condensing apparatus. The above-described method produces a dry uniform mixture of polyethylene and blowing agent in which each polyethylene granule has a coating of polystyrene with "Celogen–AZ" blowing agent therein. The polyethylene granules will not have a slippery surface such as that produced by the use of paraffin base wax. The master batch produced as above-described may be blended with seven hundred parts by weight of polyethylene to produce the desired uniformly blended one part "Celogen–AZ" to one hundred parts polyethylene mixture.

While the above process has been described for polyethylene granules as the plastic to be coated, it is obvious that many other granular, extrudable materials, such as polystyrene or polyvinyl chloride, can be treated in the same manner. It is also true that the blowing agent used does not have to be "Celogen–AZ" and may be any of a number of dust-like blowing agents, for example, Dupont "Unicel" (di-N-nitrosopentamethylenetetramine) or any other dust-like blowing agent suitable for the plastic to be extruded. The blowing agents useful in the practice of the invention, typified by the ones just mentioned, must be compatible with polyethylene and thermally decomposable at the temperatures experienced in the extrusion of polyethylene into gaseous products leaving no polar residue.

As was indicated in the above example, eight parts by weight of "Celogen–AZ" blowing agent may be deposited upon one hundred parts by weight of polyethylene granules. It has been found that as much as ten and it is believed that as much as fifteen parts by weight of blowing agent may be coated upon the master batch plastic granules. However, the maximum amount of blowing agent to be used will be determined by the proportions that give good adhesion of the blowing agent to the granule with a minimum amount of spalling and chipping away from the granule by rough handling. Using this standard the proportions given in the above specific example have been found to give good results for polyethylene and "Celogen–AZ," blends.

It should also be noted that for good results in using a lesser amount of blowing agent for coating the granules the amount of viscous solution should be kept approximately constant. Referring to the above-described specific example, if a master batch of four parts by weight of "Celogen–AZ" to one hundred parts by weight of polyethylene is desired, the six parts by weight of polystyrene-toluene viscous solution should still be used. This is true because a definite amount of viscous solution is required to coat a specific type of granule. Referring again to the above-described example and assuming that a master batch of greater than eight parts by weight of "Celogen–AZ" is desired, it may be necessary to increase the quantity of viscous solution used so as to prevent breaking away or spalling of the blowing agent from the granule by rough handling.

For other types of granules, other blowing agents and different ingredients in the viscous solution, it may be necessary to vary these proportions somewhat to produce the best results. The invention is also applicable for other granule compositions and viscous solutions, for example, xylene might be used as the solvent and polyisobutylene as the resin in solution on polyvinyl chloride granules. Still another example might be the use of polystyrene-toluene solution on polystyrene granules.

The requirements should be kept in mind, however, that the resin in solution must have similar electrical properties to the granules to be coated, that the solvent be vaporizable at room temperature and that the solvent will produce a viscous solution of the resin therein which will coat the granules uniformly. It should be noted that the reason for choosing a resin for the solution which has similar electrical properties to the granular material is to maintain the electrical properties of the blend the same as that of the unblended granular material.

While the above-described process is preferred because of the very uniform distribution of blowing agent which it produces, there are other alternatives to the process. For example, the "Celogen–AZ" blowing agent may be mixed with the polyethylene granules prior to the addition of the polystyrene-toluene solution and prior to further mixing, all of the material being used in the proportions as specifically described above; however, this alternative process was found to give not as uniform a mix as the preferred process.

Another alternative would be the same as the specific process described above except that a viscous solution of polyethylene would be used in place of a viscous solution of polystyrene; however, such an alternative would also involve the heating of both the main batch of polyethylene and the polyethylene used to produce the polyethylene-toluene solution because of the insolubility of polyethylene in toluene at room temperature.

It is to be understood that the above-described arrangements are simply illustrative of the application of the principles of the invention. Numerous other arrangements may be devised by those skilled in the art which will embody the principles of the invention and fall within the spirit and scope thereof.

What is claimed is:

1. A dry composite material suitable for use in the production of extruded cellular polyethylene, which comprises a plurality of relatively large granules of polyethylene, a film of polystyrene coating substantially uniformly the surfaces of each granule of polyethylene, and a minor amount of a blowing agent for polyethylene in the form of extremely finely-divided particles thereof adhered to the granules of polyethylene by the polystyrene films, the blowing agent being of a type which is thermally decomposable during the extrusion of polyethylene into gaseous products leaving no polar residue, said minor amount of the blowing agent being at least sufficient to produce the desired expansion and less than about 15 parts by weight of the blowing agent to 100 parts by weight of the polyethylene.

2. A starting mixture suitable for extrusion into cellular form, which comprises a dry composite material composed of a plurality of relatively large granules of polyethylene having a film of polystyrene coating substantially uniformly the surfaces of each granule of polyethylene and a minor amount of a blowing agent for polyethylene in the form of extremely finely-divided particles thereof adhered to the granules of polyethylene by the polystyrene film, the blowing agent being of a type which is thermally decomposable during the extrusion of polyethylene into gaseous products leaving no polar residue, said minor amount of the blowing agent being selected from within the range of from 5 to 10 parts by weight of the blowing agent to 100 parts by weight of the polyethylene, the coated granules comprising the dry composite material being uniformly admixed with a sufficient quantity of pure granular polyethylene to dilute the concentration of the blowing agent to that amount required to produce the desired expansion of the polyethylene.

3. The composition of claim 1, wherein the blowing agent is di-N-nitrosopentamethylenetetramine.

References Cited in the file of this patent

UNITED STATES PATENTS

| | | |
|---|---|---|
| 2,689,197 | Gerlich | Sept. 14, 1954 |
| 2,694,245 | Rogers et al. | Nov. 16, 1954 |
| 2,752,315 | Kuettel | June 26, 1956 |
| 2,819,231 | Hahn et al. | Jan. 7, 1958 |

FOREIGN PATENTS

| | | |
|---|---|---|
| 629,668 | Great Britain | Sept. 26, 1949 |